United States Patent [19]
Arnold et al.

[11] Patent Number: 5,142,626
[45] Date of Patent: Aug. 25, 1992

[54] PERSONAL COMPUTER WITH REMOVABLE MEDIA IDENTIFICATION

[75] Inventors: Alan F. Arnold; Arthur R. Wheeler, both of Boca Raton; James Tai, Deerfield Beach, all of Fla.

[73] Assignee: International Business Machines Corp., Armonk, N.Y.

[21] Appl. No.: 556,926

[22] Filed: Jul. 20, 1990

[51] Int. Cl.$^5$ ............................................. G11B 15/12
[52] U.S. Cl. ..................................... 395/275; 369/58; 364/DIG. 1; 364/236.2
[58] Field of Search .......................... 360/48, 200, 58; 395/275; 364/DIG. 1, DIG. 2

[56] References Cited

U.S. PATENT DOCUMENTS

| | | | |
|---|---|---|---|
| 4,773,036 | 9/1988 | Berens et al. | 395/425 |
| 4,916,557 | 4/1990 | Okamura | 360/48 |
| 4,928,193 | 5/1990 | Agoglia | 360/48 X |
| 4,928,237 | 5/1990 | Bealkowski | 395/700 X |

OTHER PUBLICATIONS

IBM Technical Disclosure Bulletin, vol. 30, No. 4, Sep. 1987, pp. 1778–1782, "Implementation of the Enhanced Small Device . . .".
IBM Technical Disclosure Bulletin, vol. 29, No. 6, Nov. 1986, p. 2618, "Determining the Type and Characteristics of A . . .".
IBM Technical Disclosure Bulletin, vol. 30, No. 9, Feb. 1988, pp.49–52, "Automatic Configuration in a Multi-Adapter Environment".

*Primary Examiner*—Michael R. Fleming
*Assistant Examiner*—C. H. Knoll
*Attorney, Agent, or Firm*—Daniel E. McConnell

[57] ABSTRACT

This invention relates to personal computers, and particularly to a personal computer having provision for identifying the type of direct access storage device associated with the computer and further identifying the storage capability of removable media used in the device. The apparatus disclosed uses certain ones of a plurality of signal communicating pathways extending between a storage device and a controller to distinguish between the absence of signals as indicating the presence of an older type drive and the presence of signals as indicating the presence of a newer type drive, the pattern of said signals further indicating the type of media inserted into the device with which the controller is communicating.

7 Claims, 4 Drawing Sheets

| DRVSEL | MEDTYP1 | MEDTYP0 | DEFINITION |
|---|---|---|---|
| L | H | H | 1.0 MB MEDIA |
|   |   | L | 2.0 MB MEDIA |
|   | L | H | 4.0 MB MEDIA |
|   |   | L | RESERVED MEDIA TYPE |
| H | H | H | MEDIA ID SUPPORTED |
|   |   | L | MEDIA ID NOT SUPPORTED |
|   | L | H |   |
|   |   | L |   |

| | | |
|---|---|---|
| −BAY B OCCUPIED | 1 | |
| | | 2  DATARATE SEL 1 |
| +5 VOLT SUPPLY | 3 | |
| | | 4  DRIVE TYPE 1 |
| GROUND RETURN | 5 | |
| | | 6  +12 VOLT SUPPLY |
| GROUND RETURN | 7 | |
| | | 8  −INDEX |
| DRIVE TYPE 0 | 9 | |
| | | 10 −MOTOR ENABLE 0 |
| GROUND RETURN | 11 | |
| | | 12 −DRIVE SELECT 1 |
| GROUND RETURN | 13 | |
| | | 14 −DRIVE SELECT 0 |
| GROUND RETURN | 15 | |
| | | 16 −MOTOR ENABLE 1 |
| MEDIA TYPE 1 | 17 | |
| | | 18 −DIRECTION IN |
| GROUND RETURN | 19 | |
| | | 20 −STEP |
| GROUND RETURN | 21 | |
| | | 22 −WRITE DATA |
| GROUND RETURN | 23 | |
| | | 24 −WRITE ENABLE |
| GROUND RETURN | 25 | |
| | | 26 −TRACK 00 |
| MEDIA TYPE 0 | 27 | |
| | | 28 −WRITE PROTECT |
| GROUND RETURN | 29 | |
| | | 30 −READ DATA |
| GROUND RETURN | 31 | |
| | | 32 −HEAD 1 SELECT |
| DATARATE SEL 0 | 33 | |
| | | 34 −DISKETTE CHANGE |

FIG.4

| DRVSEL | MEDTYP1 | MEDTYP0 | DEFINITION |
|---|---|---|---|
| L | H | H | 1.0 MB MEDIA |
| | | L | 2.0 MB MEDIA |
| | L | H | 4.0 MB MEDIA |
| | | L | RESERVED MEDIA TYPE |
| H | H | H | MEDIA ID SUPPORTED |
| | | L | MEDIA ID NOT SUPPORTED |
| | L | H | |
| | | L | |

FIG.5

PERSONAL COMPUTER WITH REMOVABLE MEDIA IDENTIFICATION

FIELD AND BACKGROUND OF INVENTION

This invention relates to personal computers, and particularly to a personal computer having provision for identifying the storage capability of removable media used in a direct access storage device associated with the computer.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing capability to a single user and are inexpensively priced for purchase by individuals or small businesses. Examples of such personal computer systems are IBM's PERSONAL COMPUTER XT and AT and IBM's PERSONAL SYSTEM/2 Models 25, 30, 50, 60, 70 and 80.

These systems can be classified into two general families. The first family, usually referred to as Family I Models, use a bus architecture exemplified by the IBM PERSONAL COMPUTER XT, AT and other "IBM compatible" machines. The second family, referred to as Family II Models, use IBM's MICRO CHANNEL bus architecture exemplified by IBM's PERSONAL SYSTEM/2 Models 50 through 80. Many Family I models used the popular INTEL 8088 or 8086 microprocessor as the system processor. These processors have the ability to address one megabyte of memory. Certain Family I and most Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

Such personal computers are characterized as having an "open" architecture. That is, the systems are designed and constructed in such a way that additional peripheral devices, such as removable media direct access storage devices (or DASD) may be selected and added to the systems, or an existing device may be changed for a device of a different type. The floppy disk drives mentioned above are one example of a removable media DASD. By way of example, the original Family I machines were often assembled a with a 5.25 inch, high capacity (or high density) floppy disk drive having the capability of storing 1.2 megabytes of data on a diskette. However, such machines could be equipped with a previously known type of DASD which used a 5.25 inch disk to store 360 kilobytes of data. Family II machines may have DASD using 3.5 inch diskettes to store 780 kilobytes or 1.44 megabytes of data. It is known and contemplated that other removable media DASD may be provided and may be used in or with personal computers of the general types described. Certain difficulties are raised by the fact that removable media used with various types of DASD have the same physical form factor. That is, a 5.25 inch diskette may be formatted to either one of two different storage capabilities, while a 3.5 inch diskette may conceivably be formatted to any of three.

Heretofore, it has been conventional to provide in a personal computer of the type described a central processor unit for executing instructions and manipulating data and a direct access storage device controller operatively interposed between the processor unit and the DASD for controlling the writing of data to and the reading of data from the removable media of the DASD. It has been contemplated that provision may be made in the operation of a personal computer for recognition of the type of DASD used and the storage characteristics of the media inserted into such as drive. The interested reader is referred to Berens et al U.S. Pat. No. 4,733,036 issued Sep. 20, 1988 and Agoglia et al U.S. Pat. No. 4,928,193 (both owned in common with the invention here to be described) for disclosures of apparatus and methods for determining diskette drive and media types. To any extent necessary or appropriate for an understanding of this invention, the disclosures of those prior patents are hereby incorporated by reference into this description.

BRIEF STATEMENT OF INVENTION

With the foregoing discussion in mind, it is an object of this invention to enable a personal computer system to distinguish among a plurality of types of removable media potentially used in removable media direct access storage devices associated with such a system. In realizing this object of the invention, at least certain ones of a plurality of signal communicating pathways extending between a storage device and a controller for the storage device are used to identify to the controller the type of media inserted into the device with which the controller is communicating.

Yet a further object of the invention is to enable distinction among a plurality of types of removable media while permitting a system to incorporate both older types of storage devices not specifically adapted to the determination here described and newer types of storage devices specifically equipped to be so adapted. In realizing this object of the present invention, the specifically identifying information is communicated from a DASD to a controller using pathways which, while they exist in older types of devices, have been used for other purposes.

BRIEF DESCRIPTION OF DRAWINGS

Some of the objects of the invention having been stated, other objects will appear as the description proceeds, when taken in connection with the accompanying drawings, in which:

FIG. 4 is a schematic representation of a multiple pathway interconnection between a controller and a removable media direct access storage device in accordance with this invention; and FIG. 5 is a schematic representation of an encoding scheme for communicating identifying data in accordance with this invention.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
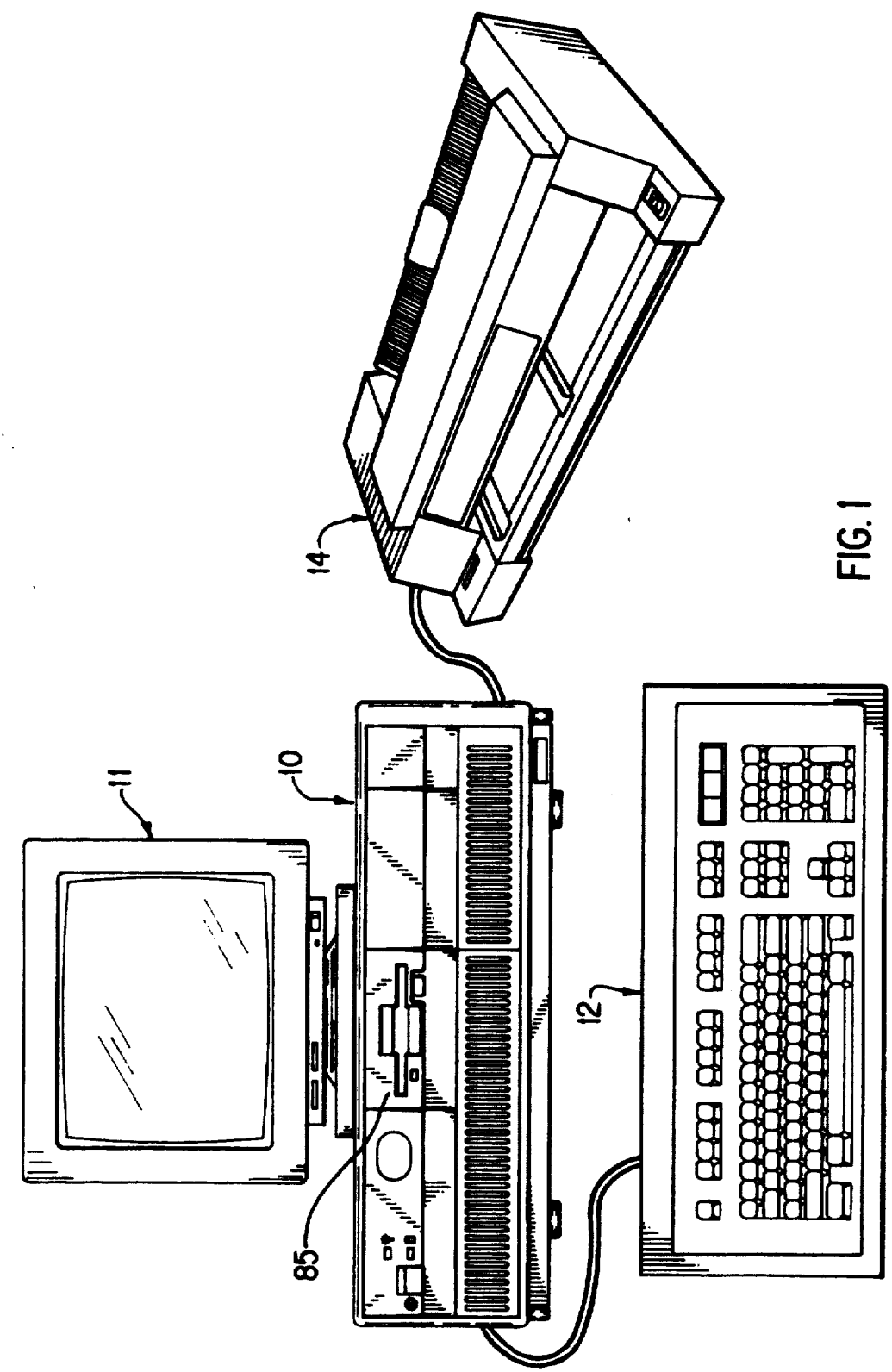
FIG. 1 is a perspective view of a personal computer embodying this invention.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like. As pointed out more fully hereinafter, provisions are made in the planar 20 for the passage of input/output signals to and from the operating components of the microcomputer.

Figure 2:
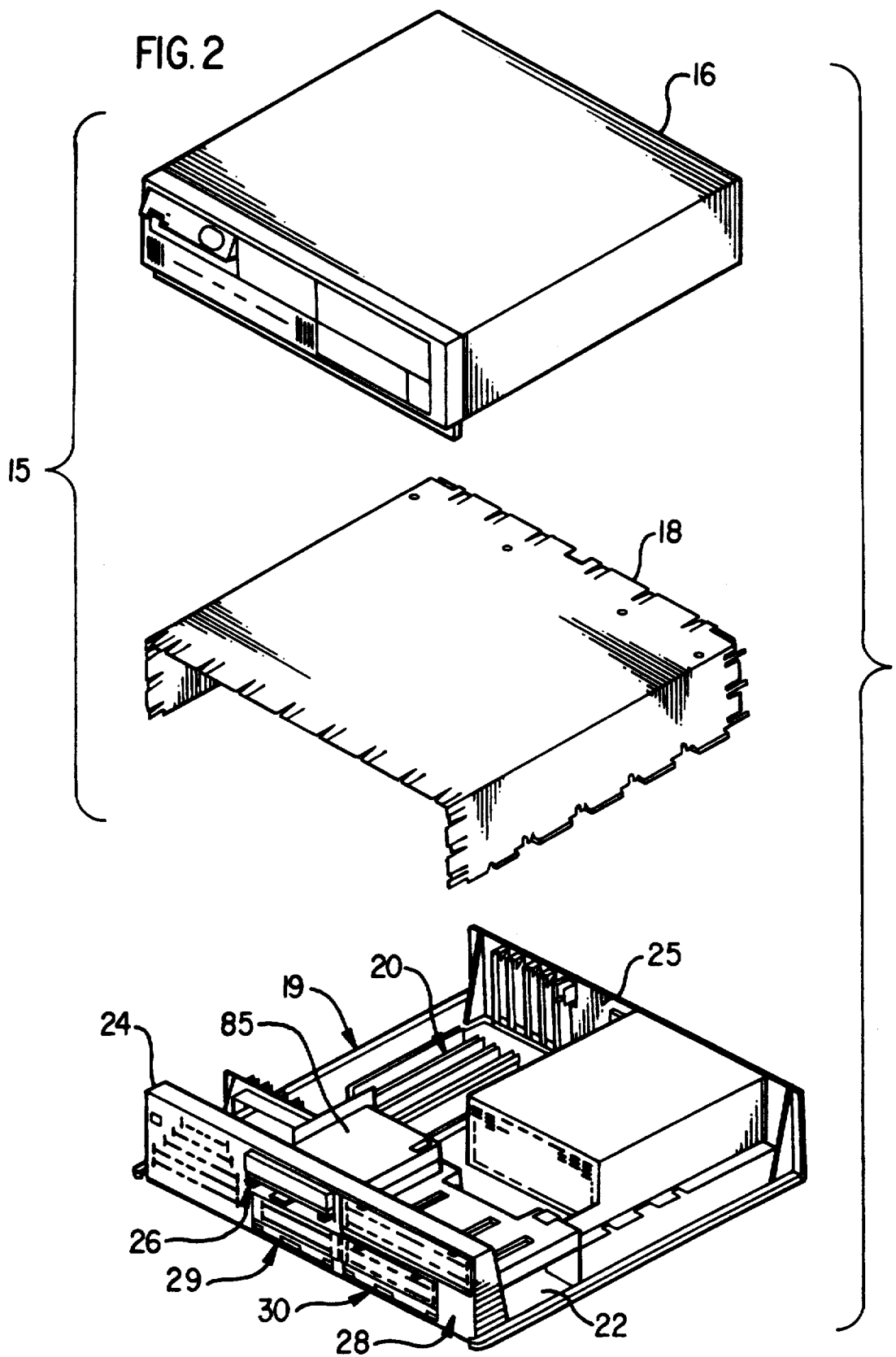
FIG. 2 is an exploded perspective view of certain elements of the personal computer of FIG. 1 including a chassis, a cover, an electromechanical direct access storage device and a planar board and illustrating certain relationships among those elements.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. One of the upper bays 26 is adapted to receive peripheral drives of a first size (such as those known as 3.5 inch drives) while the other 28 is adapted to receive drives of a selected one of two sizes (such as 3.5 and 5.25 inch) and the lower bays are adapted to receive devices of only one size (3.5 inch). One floppy disk drive is indicated at 85 in FIG. 1, and is a removable media direct access storage device capable of receiving a diskette inserted thereinto and using the diskette to receive, store and deliver data as is generally known.

Figure 3:
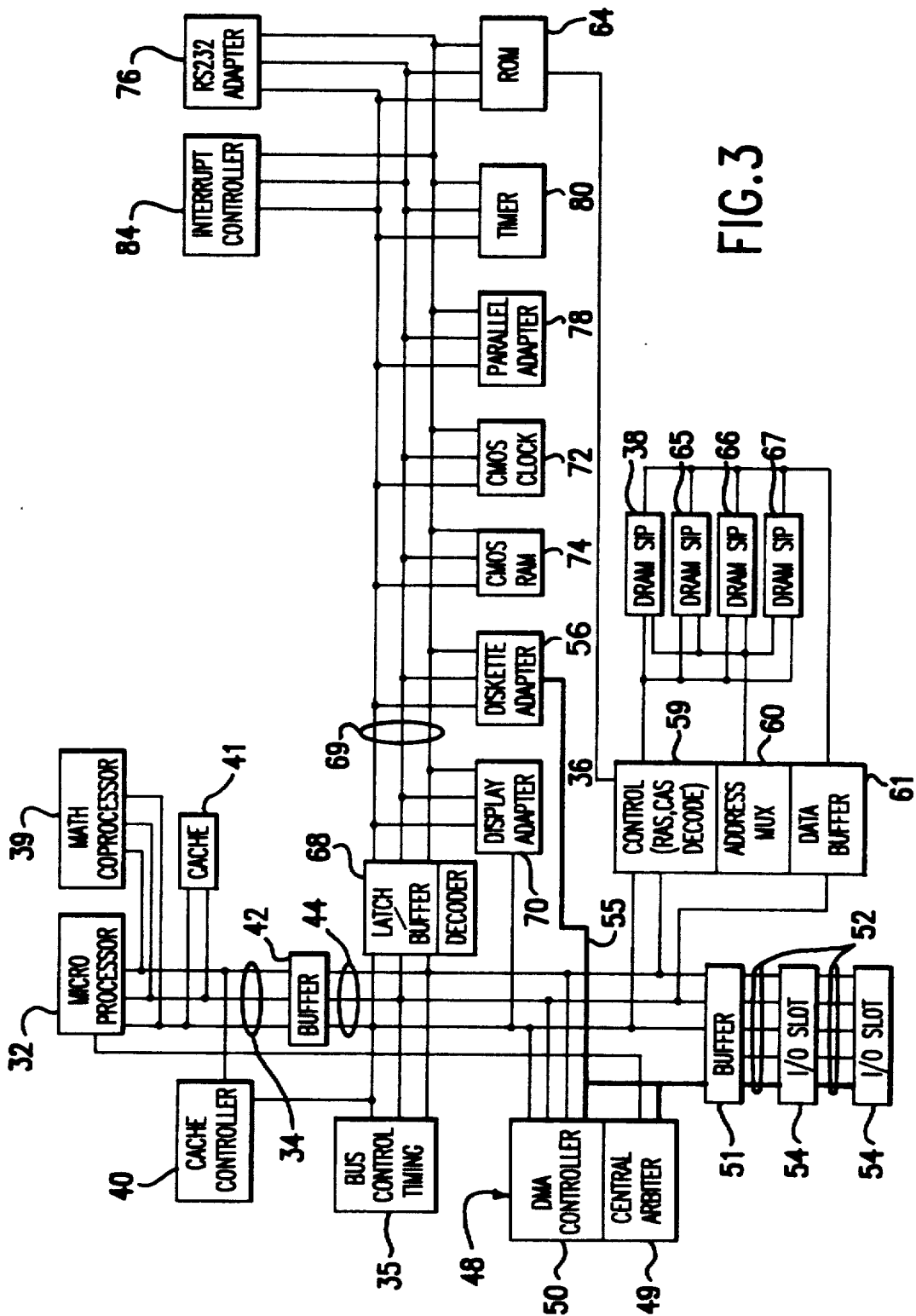
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/0 slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 68. The system bus 44 is further connected to a bus control and timing unit 35 nd a DMA unit 48. The DMA unit 48 is comprised of a central arbitration unit 49 and DMA controller 50. The buffer 51 provides an interface between the system bus 44 and an optional feature bus such as the MICRO CHANNEL bus 52. Connected to the bus 52 are a plurality of I/O slots 54 for receiving MICRO CHANNEL adapter cards which may be further connected to an I/O device or memory.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system 10 is shown with a basic 1 megabyte RAM module, it is understood that additional memory can be interconnected as represented in FIG. 3 by the optional memory modules 65 through 67. For purposes of illustration only, the present invention is described with reference to the basic one megabyte memory module 38.

A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11), a CMOS clock 72, nonvolatile CMOS RAM 74 herein after referred to as NVRAM, a RS232 adapter 76, a parallel adapter 78, a plurality of timers 80, a diskette adapter 56, an interrupt controller 84, and a read only memory 64. The read only memory 64 includes the BIOS that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The planar I/O bus 69, as described hereinafter, includes portions defined by conductive pathways formed in interior layers of the multilayer planar 20, and particularly includes a number of such pathways in a portion extending adjacent an edge of the planar 20 which is positioned to extend adjacent one of the front and rear panels of the chassis. Such design of the planar makes possible the location of a number of I/O connectors along such a side edge for exchange of signals with such devices as the monitor, keyboard and printer.

The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance NVRAM will contain data (can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

As mentioned hereinabove, the computer has a cover indicated generally at 15 which cooperates with the chassis 19 in forming an enclosed, shielded volume for containing the above identified components of the microcomputer. The cover preferably is formed with an outer decorative cover member 16 which is a unitary molded component made of a moldable synthetic material and a metallic thin sheet liner 18 formed to conform to the configuration of the decorative cover member. However, the cover can be made in other known ways and the utility of this invention is not limited to enclosures of the type described.

In personal computer of the general type here described, it has been conventional before the present invention to provide for interconnection of the controller 56 and removable media DASD such as the floppy disk drive 85 by means of multiple pathways for communicating electrical digital signals. Conventionally, such interconnection has been established either by cables connecting a controller and a drive or by the direct connection of a DASD to the system planar 20. In prior personal computers offered by International Business Machines Corporation, or which are fully compatible with such machines, the interconnection has been established by a set of thirty four pathways or conductors, with various ones of such pathways having various assigned functions. Certain such functions and pathways have been used heretofore to accomplish the determination of diskette drive and media types as disclosed for example in Berens et al U.S. Pat. No. 4,733,036 issued Sep. 20, 1988 and Agoglia et al U.S. Pat. No. 4,928,193 (both owned in common with the invention here to be described). To any extent necessary or appropriate for an understanding of this invention, the disclosures of those prior patents are hereby incorporated by reference into this description.

In order to accomplish the objectives of this invention, a pair of conductive pathways previously used with older types of DASD are assigned new functions, and the new functions are realized in a manner which enables upward compatibility of older types of drives with the new functions achieved. That is, by providing new functions for a pair of conductive pathways, a controller is enabled to distinguish among older and newer types of storage devices. Further, where the controller recognizes a newer type of device, it is enabled to distinguish by storage capability a specific type of media inserted into such a device.

In personal computers of the types described as they have been operated prior to the present invention, a power on self test procedure has determined direct access storage device presence by issuing commands to each possible drive bay and monitoring for return of a specific signal. Then, once drive presence has been established, drive type is determined by issuing a step sequence and monitoring return signals to distinguish between devices having certain storage capabilities. As the storage capability is determined, a system assumption is made as to the specific type of device provided based upon the known and anticipated devices which could be installed and have the determined storage capability.

In a personal computer of the types described as embodying this invention, a pair of pathways previously either reserved and unused or used for ground return to assure isolation of other signals are used to permit determination first of whether older or newer types of storage devices have been installed and then further, if newer types of devices are determined to be present, to permit determination of storage capability of the storage devices installed and of media inserted into such devices. More particularly, in the schematic representation of FIG. 4, pathway four has been changed from a reserved pathway having no other use to a pathway for a first drive type indicator, while pathway nine has been changed from a ground return to a pathway for a second drive type indicator. With the availability of distinguishing among the absence of any drive type signal on the pair of pathways and, if signals are found to be present, among combinations of such signals as indicative of the storage capability of the identified device accomplishes these desired results.

In the combination here described, certain characteristics of both the controller 56 and the storage device contribute to success. That is, the controller must be capable of distinguishing between the absence and presence of device identifying signals on pathways four and nine, and the storage devices must be capable of presenting such signals, both while avoiding otherwise possibly damaging effects. These capabilities enable the upward and downward compatibility which will permit use of both new and old components in the same system. Further, the storage devices must be enabled for recognition of varying media storage capability. It is contemplated that the present identification capability will involve the use of open collector devices enabled by a DRIVE SELECT input from the controller. Use of open collector drivers allows older type storage devices which do not otherwise support this identification scheme to be used on the interface without damaging identification enabled storage devices.

It is to be noted that the simple distinction between type of storage devices here described is the subject matter of separate protection sought by co-pending United States patent application Ser. No. 07/555326 filed concurrently herewith. The invention for which protection is here sought involves the further determination of the type of media inserted into a storage device.

It is to be noted that it has been proposed to provide media characteristic determination both from sensing physical characteristics imparted to the media (such as the presence or absence of holes or openings at certain predetermined positions in removable disk housings or enclosures) and from sensing media formatting as described in Berens et al U.S. Pat. No. 4,773,036. This invention contemplates the usefulness of both approaches, as will become more clear hereinafter.

As with the storage device type identification described above, a pair of pathways previously either reserved and unused or used for ground return to assure isolation of other signals are used to permit determination of the memory capability of media inserted into an identified storage device having the capability of facilitating such determination. More particularly, in the schematic representation of FIG. 4, pathway seventeen has been changed from a ground return pathway to a pathway for a first media type indicator, while pathway nine has been changed from a ground return to a pathway for a second media type indicator. With the availability of distinguishing among the absence of any media type signal on the pair of pathways and, if signals are found to be present, among combinations of such signals as indicative of the storage capability of the media inserted into an identified device accomplishes these desired results.

Typical media identification codings are schematically illustrated in FIG. 5. The coding scheme assumes that a selected one of two types of DRIVE SELECT signals may be sent, a low (L) and a high (H). The storage device may reply, on enabling of the identification drivers by receipt of a DRIVE SELECT signal, by patterns of high and low signals on each of the pair of pathways, here identified as MEDTYP1 and MEDTYP0. One possible assignment of significance to the responses is shown.

In operation, the procedure for determining system configuration would include steps of deselecting all storage devices, reading the assigned input port, and testing for a binary "11" combination. The presence of any other combination would be indicative that at least one installed storage device does not support the media identification scheme here disclosed, leading to a conclusion that the identification returned by all installed devices be deemed invalid. With determination of an invalid identification, a user would be compelled into a manual configuration routine in which the user would supply the information necessary for satisfactory use of the associated storage devices. Should it be determined that the storage devices support the media identification scheme here disclosed, then a DRIVE SELECT signal would be sent in turn to all applicable devices, and the enabled identification signals returned read to update the configuration table of the system as to drive type.

If media sensing is determined to be supported, then selection of a particular storage device on which a read/write/format operation is to be performed would initiate a determination of whether removable media was then installed in the storage device. If it were determined that media was absent, a user would be prompted to insert media. If media were found present, then the status of the media sense pathways seventeen and twenty seven would be read to determine from sensed characteristics of the media (such as holes) which type of media had been installed.

Should the operation request be for formatting, then the media would be formatted in a manner consistent with the media sense determination. Should the requested operation be a read or write operation, then the previously disclosed media determination procedure (that of Berens et al U.S. Pat. No. 4,773,036 mentioned hereinabove) would be used to establish how the media had been formatted. If the existing format was found to be consistent with the media sense determination in accordance with this invention, then the requested operation would proceed. If found to be inconsistent, then the user would be warned that there was a potential for error. The user would be able to give instructions that the requested operation proceed, in which event the determination made by the Berens et al procedure would take precedence over the determination made by sensing the physical characteristics of the media, and the system would ignore the media sense information presented on the MEDTYP1 and MEDTYP0 pathways.

In the drawings and specifications there has been set forth a preferred embodiment of the invention and, although specific terms are used, the description thus given uses terminology in a generic and descriptive sense only and not for purposes of limitation.

What is claimed is:

1. A personal computer comprising:
  a central processor unit for performing instructions,
  a removable media direct access storage device for receiving, storing and delivering data for manipulation by said central processor unit and for originating signals indicative of the storage capability of media inserted into said storage device,
  a direct access storage device controller operatively interposed between said processor unit and said storage device for directing operation of said storage device in receiving, storing and delivering data, and
  a plurality of signal conducting pathways operatively connecting said storage device and said controller, certain of said pathways conducting read data, write data, head step and home track signals,
  a predetermined plurality of said pathways less than the entirety of said plurality of pathways and other than said certain pathways conducting media type signals originated by said storage device which identify to said controller the storage capability of media inserted into said storage device,
  said controller distinguishing among:
    (a) the absence of signals conducted by said predetermined plurality of pathways as indicating the presence of a first type of storage device compatible with said controller; and
    (b) the presence of signals conducted by said predetermined plurality of pathways as indicating the presence of a second type of storage device compatible with said controller; and
    (c) a plurality of differing combinations of signals conducted by said predetermined plurality of pathways as indicating the storage capability of media inserted into said second type of storage device.

2. A personal computer comprising:

a central processor unit for performing instructions, a removable media direct access storage device for receiving, storing and delivering data for manipulation by said central processor unit and for originating signals indicative of the storage capability of media inserted into said storage device, a direct access storage device controller operatively interposed between said processor unit and said storage device for directing operation of said storage device in receiving, storing and delivering data, and a plurality of signal conducting pathways operatively connecting said storage device and said controller, certain of said pathways conducting signals for read data, write data, head step and home track signals, a pair of said pathways other than said certain pathways conducting media type signals originated by said storage device which identify to said controller the storage capability of media inserted into said storage device, said controller distinguishing among:
(a) the absence of signals conducted by said pair of pathways as indicating the presence of a first type of storage device compatible with said controller; and
(b) the presence of signals conducted by said pair of pathways as indicating the presence of a second type of storage device compatible with said controller; and
(c) a plurality of differing combinations of signals conducted by said pair of pathways as indicating the storage capability of media inserted into said second type of storage device.

3. A personal computer according to claim 2 further comprising a driver device associated with each one of said pair of said pathways, each said driver device having the capability of delivering an appropriate signal indicative of the storage capability of media inserted into said storage device and further of isolating said storage device and said controller from any adverse effects otherwise possibly following from an inability of said controller to recognize such a signal indicative of the storage capability of media.

4. A personal computer according to claim 2 further wherein said controller issues to said storage device through another of said pathways an enabling signal initiating the conduction of signals through said pair of said pathways.

5. A personal computer system having a high speed system processor compatible with application programs and operating system software designed to execute on slower speed system processors, said personal computer system comprising:

a high speed microprocessor having a real and protected mode of operation and being coupled to a high speed data bus;

volatile memory electrically coupled to the high speed data bus;

non-volatile memory electrically coupled to a slower speed data bus;

a bus controller for providing communications between the high speed data bus and the slower speed data bus;

a memory controller electrically coupled to said volatile memory and said non-volatile memory, said memory controller regulating communications between said volatile memory and said high speed microprocessor;

a removable media direct access storage device for receiving, storing and delivering data for manipulation by said microprocessor and for originating signals indicative of the storage capability of media inserted into said storage device, a direct access storage device controller operatively interposed between said microprocessor and said storage device for directing operation of said storage device in receiving, storing and delivering data and electrically coupled to the slower speed data bus, and a plurality of signal conducting pathways operatively connecting said storage device and said controller, certain of said pathways conducting signals for read data, write data, head step and home track signals, one pair of said pathways other than said certain pathways conducting signals originated by said storage device which identify to said controller the storage capability of media inserted into said storage device, said controller distinguishing among:
(a) the absence of signals conducted by said pair of pathways as indicating the presence of a first type of storage device compatible with said controller; and
(b) the presence of signals conducted by said pair of pathways as indicating the presence of a second type of storage device compatible with said controller; and
(c) a plurality of differing combination of signals conducted by said pair of pathways as indicating the storage capability of media inserted into said second type of storage device.

6. A personal computer according to claim 5 further comprising a driver device associated with each one of said pair of said pathways, each said driver device having the capability of delivering an appropriate signal indicative of the storage capability of media inserted into said storage device and further of isolating said storage device and said controller from any adverse effects otherwise possibly following from an inability of said controller to recognize such a signal indicative of the storage capability of media.

7. A personal computer according to claim 5 further wherein said controller issues to said storage device through another of said pathways an enabling signal initiating the conduction of signals through said pair of said pathways.

* * * * *